Jan. 2, 1951  C. L. COOK ET AL  2,536,910
WOOD SAW ATTACHMENT FOR TRACTORS
Filed May 18, 1945  2 Sheets-Sheet 1

INVENTOR.
CURTISS L. COOK
JEFFERY R. SPURLING
BY
ATTORNEYS.

WITNESS

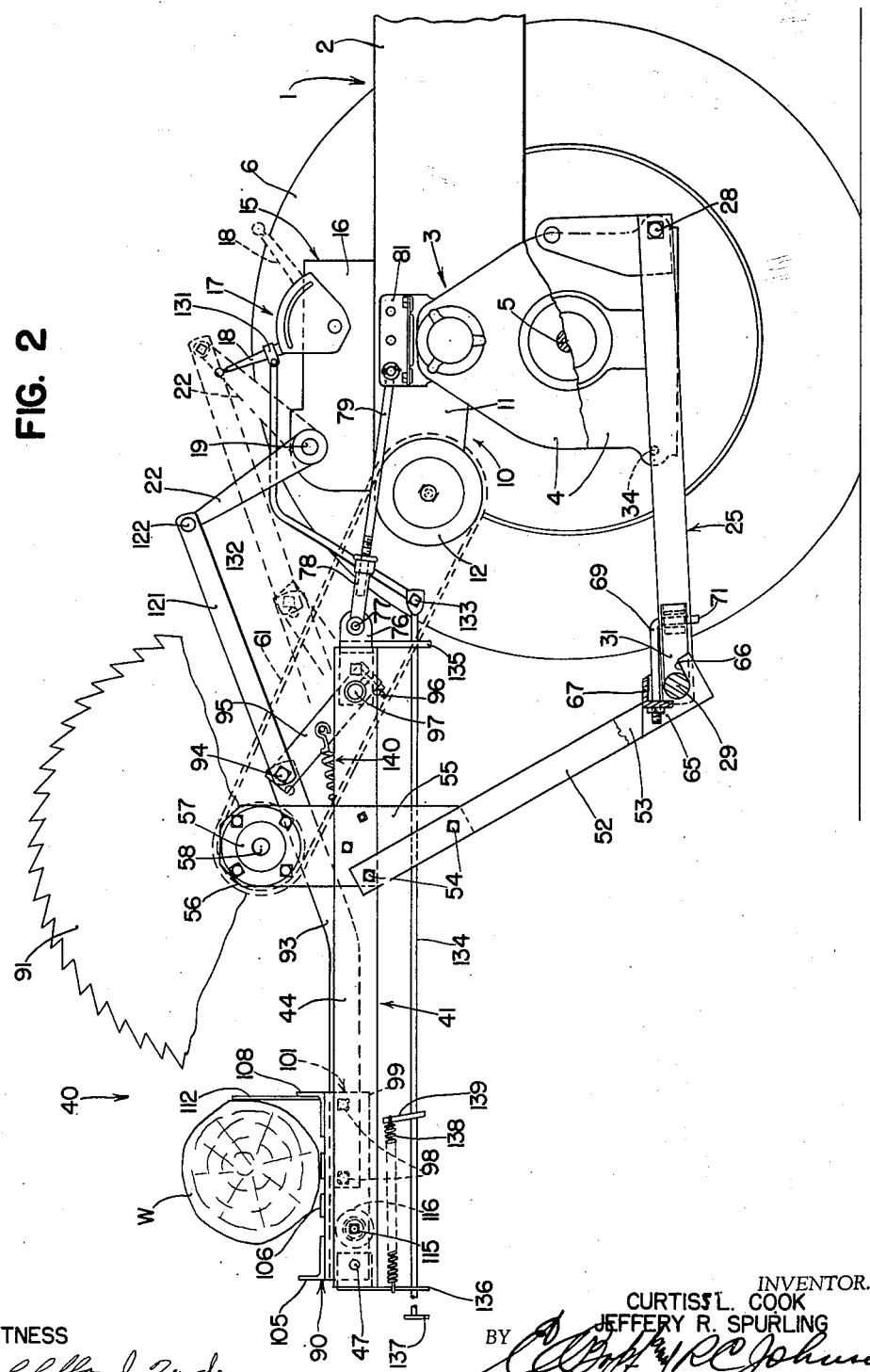

Patented Jan. 2, 1951

2,536,910

UNITED STATES PATENT OFFICE 2,536,910

WOOD SAW ATTACHMENT FOR TRACTORS

Curtiss L. Cook and Jeffrey R. Spurling, Syracuse, N. Y., assignor to Syracuse Chilled Plow Co., Inc., Syracuse, N. Y., a corporation of New York Application May 18, 1945, Serial No. 594,550

9 Claims. (Cl. 143—43)

The present invention relates generally to agricultural machines and more particularly to attachments adapted to be mounted on a farm tractor or the like.

The object and general nature of the present invention is the provision of an attachment adapted to be mounted on the rear portion of a farm tractor and including an operating part connected to be driven from the power take-off of the tractor. More particularly, it is a feature of this invention to provide an attachment of this nature with means whereby the work carrier thereof is shiftable toward and away from the operating member by a power unit mounted on the tractor, such as, for example, the power lift unit which normally forms a part of the tractor. It is particularly a feature of this invention to provide a wood saw attachment that not only is adapted to be mounted easily and quickly onto the tractor, and easily and quickly removed therefrom, but which is easily and conveniently controlled by virtue of connecting the work carrier with the power lift unit of the tractor so that the movement of the wood into and away from the saw may be performed without effort and may be easily and accurately controlled. More especially, it is a feature of this invention to provide means on the attachment to be connected with the tractor control for the power lift unit whereby the movement of the work carrier may be controlled from a point adjacent the attachment, preferably closely adjacent the work carrier under which the wood to be sawed is placed.

These and other objects and advantages of the present invention will be apparent to those skilled in the art after a consideration of the following detailed description, taken in conjunction with the accompanying drawings in which one form of our invention has been illustrated.

In the drawings:

Figure 2 is a side view of the attachment shown in Figure 1.

Figure 1:
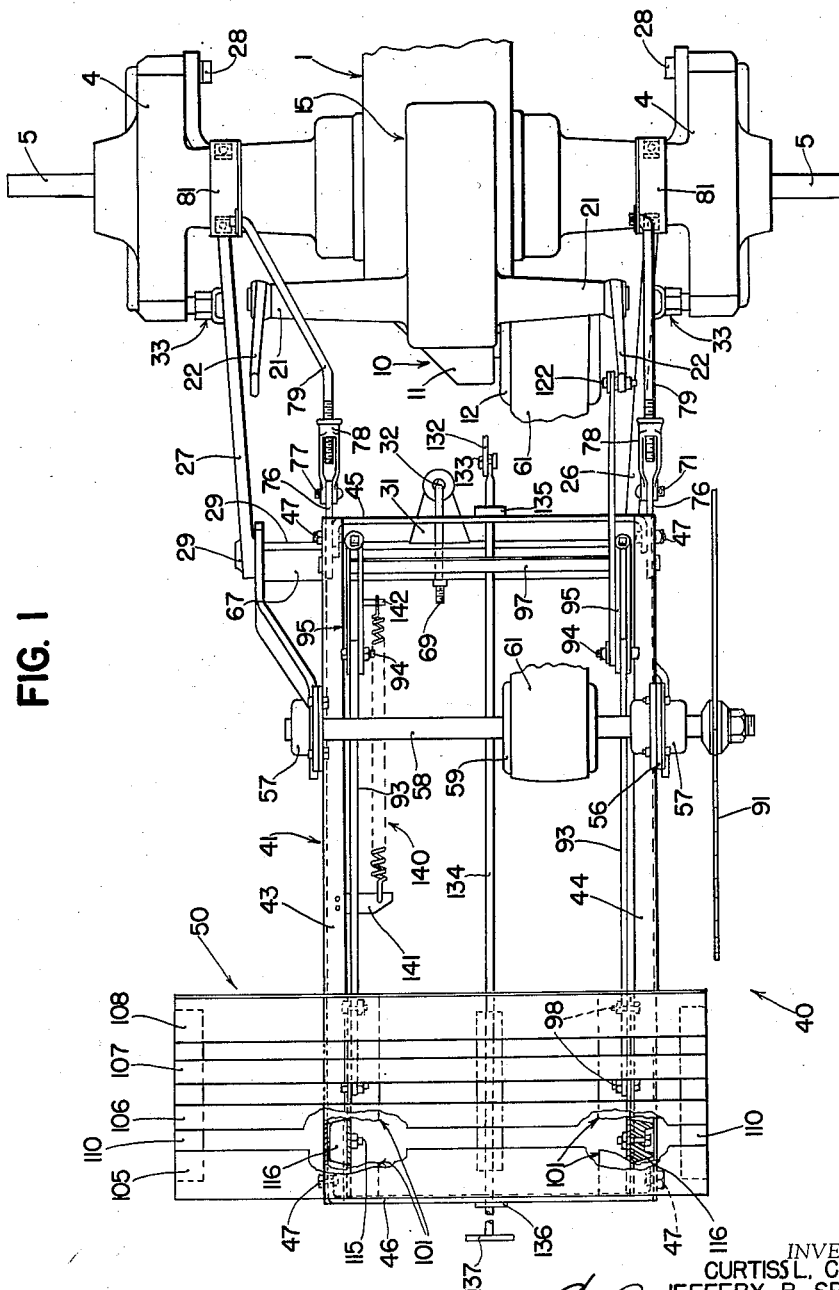
Figure 1 is a plan view of a wood saw attachment in which the principles of the present invention have been incorporated.

Referring now to the drawings, the tractor on which the attachment, with which the present invention is more particularly concerned, is mounted as indicated by reference numeral 1 and comprises a motor unit 2 which also serves as the main frame of the tractor, the rear portion of which is supported by a rear axle structure 3, including a pair of drop axle housings 4. Journaled in each of the drop housings 4 is a laterally outwardly extending axle shaft 5 on which the associated rear wheel 6 is fixed. The tractor 1 also includes a power take-off unit 10, which includes a power take-off support housing 11 and a drive pulley 12 mounted for rotation about a transverse axle. By suitable controls, including a clutch or the like (not shown), power may be delivered to the power take-off pulley 12 whenever the motor is running and entirely irrespective of whether or not the tractor is moving, as in conventional tractors. The tractor 1 also includes a power lift unit 15 of the hydraulic type. This unit includes a piston and cylinder device 16, control mechanism 17 therefor, comprising a valve lever 18 normally operated manually, and an operating power lift shaft 19 that is journaled in extensions 21 forming a part of the casing of cylinder unit 16. A pair of arms 22 are fixed to the power lift shaft 19. The drawbar of the tractor is indicated in its entirety by the reference numeral 25 and comprises right and left hand members 26 and 27, pivotally connected, as by studs 28, to the forward sides of the drop housings 4. The rear ends of the drawbar members 26 and 27 are rigidly secured, as by welding, to a transverse bar 29. An implement-receiving lug 31 is secured as by welding to the central portion on the transverse bar 29 and extends generally forwardly, being apertured, as at 32, to receive fastening means by which the implement attachment may be held in place. Various types and kinds of implements may be connected to the drawbar 25. In some cases these implement attachments may swing about the transverse axis defined by the studs 28, and in other cases it may be desired, as in this case, to fix the drawbar 25 against vertical swinging, which may readily be done by suitable clamps or stops 33 (Figure 1) which engage the drawbar members 26 and 27 and are inserted in openings 34 formed in the rear portion of the drop housings 4, as shown in Figure 2.

The wood saw attachment, with which the present invention is more particularly concerned, is indicated in its entirety by the reference numeral 40. The wood saw attachment comprises a support or main frame 41 which preferably is made up of two longitudinally extending laterally spaced channels 43 and 44 which are connected together at their front and rear ends by cross pieces 45 and 46, the ends of which are bent over and bolted, as at 47, to the channels. The flanges of the channels 43 and 44 preferably face inwardly in order to form guideways for the rollers upon which the work carrier, indicated in its entirety by the reference numeral 50, which forms a part of the attachment 40. The main frame or support 41 is rigidly mounted on the tractor by a pair of downwardly and forwardly extending brace members 52 and 53, each of which is secured, as by bolts 54, to the lower portion of a bracket 55 that is rigidly bolted to the associated frame channel. The brackets 55 extend upwardly, as at 56, and receive suitable bearings 57 in which a shaft 58 is mounted for rotation. A pulley 59 is mounted on the drive shaft 58 in line with the power take-off pulley 12, and these pulleys are connected by a driving belt 61. The lower ends of the brace bars 52 and 53 are secured, as by welding, to a pair of side plates 65, each of which is notched, as at 66. The two side plates are rigidly connected together by a cross angle 67 the ends of which are preferably welded to the two side plates 65. In this way the lower ends of the supporting braces 52 and 53 are rigidly connected together, forming a rigid part of the main frame 41 of the attachment. A hook bolt 69 is preferably carried by the central portion of the cross angle 67 and has its forward end 71 disposable in the opening 32 in the tractor drawbar bracket 31, as best shown in Figures 1 and 2. The notches 66 receive the transverse bar 29 of the tractor drawbar 25, as best shown in Figure 2, and when the drawbolt 69 is tightened, the parts are firmly held together. The lateral spacing between the side plates 65 is such that they fit snugly between the rear ends of the drawbar members 26 and 27, as best shown in Figure 1. Most of the weight of the wood saw attachment is carried on the tractor drawbar 25, but in order to hold the attachment in the proper position, and also to provide for keeping the belt 61 at the proper tension, the forward end of the main frame 41 is provided with a pair of forwardly extending lugs 76, each of which is apertured to receive a pin 77 by which the swivel 78 of an adjusting link structure 79 is pivotally connected thereto. The forward end of each link 79 is turned laterally and inserted in one of several openings in a bracket 81 that is fixed in a suitable way to the rear axle 3 of the tractor. These links 79 serve to stabilize the attachment and hold the same in the proper position. They may be easily and quickly removed by removing the cotters for holding the laterally turned ends of the links 79 in the bracket 81.

A work carrier 90 is mounted for movement on the support or main frame 41 and receives the log or stick of wood to be sawed by the saw 91 that is fixed to the right end of the shaft 58. The wood carrier 90 comprises a pair of longitudinally extending bars 93 pivotally connected, as at 94, at their forward ends to a pair of arms 95, preferably formed as a strap member bent into U shape, as best shown in Figure 1. Each of these arms 95 is secured, as by a bolt 96, to a transverse rockshaft 97 that is mounted for rocking movement in the front ends of the main frame channels 43 and 44. The rear ends of the carrier frame bars 93 are bolted, as at 98, to the vertical flanges 99 of a pair of brackets 101 formed of angle stock which form the principal cross supports to which the transverse members 105, 106, 107 and 108 are connected, as by welding. The front member 108 and the rear member 105 may be in the form of angle members, as best shown in Figure 2, and the end portions of these several members are connected together by a cross strap 110 to which the members 105—108 are fixed, as by welding. These members and associated parts form the receiver for the log or stick of wood to be sawed, and preferably the front angle member 108 carries a vertical plate 112 forming a stop or abutment, as best shown in Figure 2. The rear portion of each of the angle members 101 has its vertical flange apertured to receive a bearing bolt 115 on which a roller 116 is mounted for rotation. The rollers 116 are shaped to roll along the guideways formed by the flanges of the channels 43 and 44. It will be noted, particularly from Figure 2, that the rollers 116 are disposed substantially directly underneath the bars 105—108 on which the wood W to be sawed is normally disposed, whereby the rollers support the principal portion of the weight of the work mounted on the carrier 90 while the front ends of the carrier bars 93 are supported on the rockshaft 97.

The carrier 90 is connected to be shifted toward and away from the saw 91 by power derived from the tractor power lift unit 15. To this end, the right pivot bolt 94 receives the rear end of a link 121, the forward end of which is connected, as at 122, to the right hand power lift arm 22. The present invention is not concerned with the particular details of the power lift unit 15, and hence it will suffice for the present disclosure to point out that the cylinder unit 16 includes a cylinder and a piston, the latter being connected to the power lift rockshaft 19 so that by shifting the valve lever 18, as for example, from its full line position to its dotted line position, Figure 2, fluid under pressure is delivered to the cylinder 16 to cause the rockshaft 19 to be rocked, swinging the power lift arms 22 from their full line position into their dotted line position, Figure 2. This motion is transmitted by the link 121 to the work carrier 90. According to the principles of the present invention the valve lever 18 may be operated by means that is accessible to the operator at the rear of the tractor, and to this end we provide a clamp collar 131 on the valve lever 18. A link 132 is pivotally connected at its front end to the clamp collar 131 and at its rear end, as at 133, to a longitudinally shiftable rod 134 which is movably supported in a pair of depending brackets 135 and 136 on the front and rear ends, respectively, of the main frame or support 41. A push plate 137 is fixed to the rear end of the operating rod 134, and the latter is biased for movement into its rear position by a spring 138 that is connected at its rear end to the rear bracket 136 and at its front end by a friction clip 139 to the rod 134. Thus, by pushing forwardly on the push plate 137, the valve lever 18 may be moved from its rear position to its forward position, which causes the power lift arms 22 to be swung forwardly, and this will shift the carrier 90, including the work W thereon, into the saw 91. However, as soon as pressure on the push plate 137 is removed, the spring 138 acts to shift the rod 134 rearwardly, which restores the valve lever 18 to its rear position, and this causes the power lift arms 22 to be swung rearwardly, thus moving the carrier 90 away from the saw 91. It is thus not necessary for the operator to be required to force the wood manually into the saw or to exert any particular effort to shift the wood either toward or away from the saw, the effort being provided by the aforesaid connections to the tractor power lift 15. In this way, the danger of an operator getting his fingers or hands cut by the saw is materially reduced, since it is not necessary for the operator to exert any manual effort so far as pushing the wood into the saw is concerned. The push plate 137 and rod 134 may be actuated not only by the hands of the operator but by his knee or leg or some other portion of his body while standing in a more or less fixed position on the ground. As mentioned above, as soon as pressure on the plate 137 is relieved, the carrier is automatically shifted rearwardly away from the saw.

In some tractors the power operated unit 17 may be a single acting piston and cylinder device, rather than a double acting unit. In that case, we provide a return spring 140 and connect it at its rear end by a bracket 141 to the frame bar 43. The front end of the spring 140 is connected to a stud 142 that is fixed in any suitable way to the arm 95, as best shown in Figure 1. Thus, the power operated unit may, if single acting, be operated to shift the carrier toward the saw, under the control of the valve 18 and push bar 137, but when pressure is released from the latter, which releases the oil in the cylinder 16, the spring 140 will act to shift the carrier rearwardly.

While we have shown and described above the preferred structure in which the principles of the present invention have been incorporated, it is to be understood that our invention is not to be limited to the particular details shown and described above, but that, in fact, widely different means may be employed in the broader aspects of our invention.

What we claim, therefore, and desire to secure by Letters Patent is:

1. An attachment for use with a tractor having a power take-off, a power lift unit, and a control lever for the latter, said attachment comprising a support, an operating member carried thereby, means for mounting said support on the tractor, means for driving said operating member from said power take-off, a work carrier shiftable relative to said support and movable toward and away from said power operated member, means for connecting said work carrier with said tractor power lift for shifting the work carrier along said support and toward and away from said power operated member by power derived from the tractor power lift, and means on said support connectible to said control lever for operating the tractor power lift to shift said work carrier.

2. An attachment for use with a tractor having a power take-off unit and a power operated unit including a movable valve for controlling the operation of said power operated unit, said attachment comprising a support, means for rigidly attaching said support to the tractor, a work carrier shiftable relative to said support, a saw rotatably mounted on said support, means for driving said saw from the tractor power take-off, said work carrier being shiftable toward and away from said saw, means operated by said power operated unit on the tractor for shifting said work carrier relative to said saw, and control means movably mounted on said support and connected with said valve for operating the latter to cause said power unit to shift said carrier, said control means being movable on said support in the same direction the carrier is moved by said power operated unit in response to a movement of said valve in said same direction.

3. An attachment for a tractor having a power lift unit including a pair of rockable arms, said attachment comprising means serving as a frame, a rockshaft thereon, arms carried by said rockshaft, a part shiftable relative to said frame means and supported at one end on the latter, means for supporting the other end of said part on said rockshaft arms, and link means connecting said rockshaft with the power lift unit arms, whereby operation of the tractor power lift shifts said shiftable part.

4. A wood saw attachment for tractors and the like having a power lift unit including rockable arms and means for controlling the same, said attachment comprising frame means including a pair of channels, a rockshaft rockably mounted at one end of said frame channels, a work carrier comprising a transverse work receiving unit and a pair of generally longitudinally extending members, a pair of arms on said rockshaft pivotally connected with said members adjacent their inner ends, means including a pair of rollers movable along said channels for supporting the outer ends of said members opposite said rockshaft, and link means connecting said rockshaft with the tractor power lift arms, whereby operation of said power lift unit serves to rock said rockshaft and shift said work carrier.

5. An attachment for a tractor having a power operated implement lift and valve control means for operating said lift, said attachment comprising a support adapted to be fixed to the tractor, an operating member on said support, a part movable toward and away from said member, means for connecting said part with said implement lift of the tractor to be actuated thereby, and auxiliary control means on said support and adapted to be connected with said valve control means, said auxiliary control means including a first part slidable fore and aft on said support and a link pivotally connected to said part and adapted to be connected to said valve control means.

6. A power saw attachment for tractors and the like having a power take-off and a power lift unit operable in opposite directions, said attachment comprising a support adapted to be fixed to the tractor so as to be supported entirely on the tractor in operation, a saw rotatably mounted on said support, means for driving said saw from the power take-off of the tractor, a shiftable work carrier mounted on said support for movement toward and away from said saw, a connection between said shiftable work carrier and said power lift unit of the tractor, a generally longitudinally extending control member supported on the front and rear portions of said support and shiftable generally longitudinally thereon, means connecting the front end of said longitudinally shiftable control member with the tractor power lift unit for controlling the latter, means on the rear end of said longitudinally shiftable control member for facilitating its movement by an operator at the rear of said attachment, and spring means acting between said support and said control member for normally urging the tractor power lift unit into a position causing the work carrier to be moved away from said saw.

7. An attachment for farm tractors and the like having a power take-off pulley, a power unit, and a fore and aft movable element for controlling said unit, said attachment comprising a support, a driven part mounted thereon including a driven pulley mounted for rotation about a transverse axis, means for swingably mounting said support on the tractor for movement about a transverse axis spaced from said first mentioned axis, a driving belt adapted to be trained over said pulleys, an adjustable part connected with said support and adapted to be connected with the tractor for holding said suport in different positions relative to the tractor, so as to provide for securing and maintaining the desired adjustment of said belt, an operating part movably carried by said support and adapted to be operatively connected with the tractor power unit to be actuated thereby, and a control member mounted for generally fore and aft movement on said support and adapted to be connected with said movable power unit controlling element for actuating the latter, movement of said control member relative to said support accommodating any movement of the attachment support provided for by said adjustable part in securing or maintaining the desired adjustment of said belt.

8. An attachment for a tractor having a power lift unit, said attachment comprising means serving as a frame, means for rigidly connecting said frame with the tractor so that a portion of said frame extends generally horizontally rearwardly of the tractor, a rockshaft on said frame means adjacent the forward portion thereof but rearwardly of the tractor, arms carried by said rockshaft, a part shiftable relative to said frame means and movably supported at its rear end on the rear portion of the horizontal portion of said frame means, means for supporting the forward end of said part on said rockshaft arms, and link means connecting said rockshaft with the power lift unit, whereby operation of the tractor power lift shifts said shiftable part.

9. An attachment for a tractor having a power lift and a power take-off pulley adjacent the rear end of the tractor, said attachment comprising a support, a belt-driven operating member rotatably carried on said support, means for swingably connecting said support with the rear portion of the tractor so as to be entirely supported on the tractor, said operating member being adapted to be driven by a belt trained over said power take-off pulley on the tractor, said support being swingable in a direction relative to the tractor for changing the tension in the belt, a manually adjustable link extending from said support to a point on the tractor generally in the same direction as said belt, whereby changing the effective length of said connection serves to adjust the tension in said belt, a member mounted on said support for movement toward and away from said belt-driven operating member, and means for connecting said movable member with said tractor power lift.

CURTISS L. COOK.
JEFFREY R. SPURLING.

REFERENCES CITED

The following references are of record in the file of this patent:

UNITED STATES PATENTS

| Number | Name | Date |
| --- | --- | --- |
| 396,935 | Ivey | Jan. 29, 1889 |
| 414,421 | Lipe | Nov. 5, 1889 |
| 1,321,917 | Hensel | Nov. 18, 1919 |
| 2,350,880 | Dellinger et al. | June 6, 1944 |